Patented Sept. 3, 1935

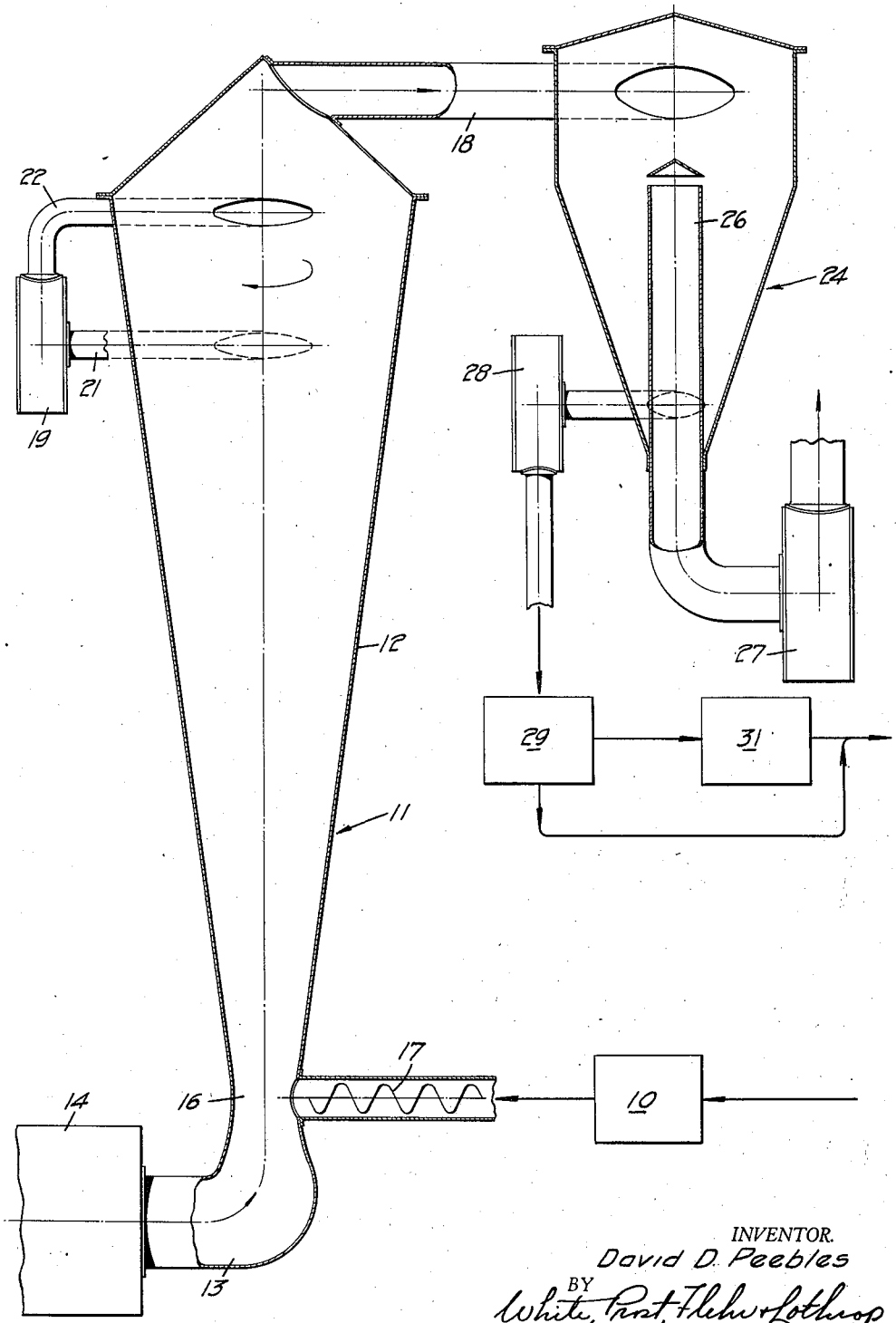

2,013,476

UNITED STATES PATENT OFFICE 2,013,476

METHOD OF MANUFACTURING DRIED STOCK FEED

David D. Peebles, Eureka, Calif., assignor to Western Condensing Company, San Francisco, Calif., a corporation of California Application November 21, 1932, Serial No. 643,571

2 Claims. (Cl. 99—11)

This invention relates generally to food products for livestock, and to methods for commercially manufacturing the same.

It is an object of the present invention to provide a livestock feed which will be readily digestible and of high nutritive value, and which will be suitable for poultry.

It is a further object of the invention to provide a method of manufacturing a stock feed from green alfalfa or like vegetable material, which will require a minimum of apparatus, and which will not impair the vitamine content of the final product to a substantial degree, Further objects of the invention will appear from the following description in which the preferred embodiment of the invention has been set forth in detail in conjunction with the accompanying drawing.

The basic ingredient which I utilize in the manufacture of my product is preferably alfalfa, or like vegetable material which can be had in green condition. Assuming that alfalfa is employed, the first step in my method is to chop the green alfalfa, as indicated at 10, by passing the same thru a chopping or cutting machine. While the alfalfa employed should be in green condition, it may have lost a part of its water content by exposure to the atmosphere, so that it contains say 60% moisture. The chopped alfalfa is then treated in a desiccator, such as indicated at 11, to effect desiccation of the same.

The particular desiccator illustrated consists of an elongated upright treatment chamber 12, which is conical in shape, and in which the chopped alfalfa is suspended in contact with a drying gas. For introducing a suitable drying gas, such as heated air or hot products of combustion diluted with air, into chamber 12, I have shown a conduit 13, connected to the outflow side of a furnace 14. Conduit 13 communicates with the lower end of chamber 12 thru a restricted throat 16. The chopped alfalfa is introduced into throat 16, by means of a screw conveyor 17 or equivalent mechanism. The dried alfalfa, together with the gas which serves to pneumatically convey the same, is removed from the upper portion of the treatment chamber thru conduit 18. Discharge of alfalfa particles which have not been properly dried, is prevented by a recirculation system associated with the upper portion of the chamber 12. Thus I have shown a blower 19, having its inflow side connected tangentially with chamber 12, thru conduit 21. The discharge side of blower 19 is also connected tangentially with chamber 12, thru conduit 22. Operation of blower 19 serves to continually remove and reintroduce gas into the upper portion of chamber 12, thus creating an upper zone in which air swirls about the vertical axis of the chamber. Such swirling gas currents tend to retain the particles within the treatment chamber until they are properly dried.

In order to remove the solid material conveyed thru conduit 18, from the conveying air, suitable means such as a pneumatic separator 24, can be employed. This separator can be of the cyclone type, having an exhaust conduit 26 connected to the inflow side of blower 27. The desiccated material from the cyclone separator 24 can be removed by blower 28, together with a sufficient amount of gas to pneumatically convey the same.

The desiccated material removed by blower 28 contains from 3 to 10% moisture, and consists of divided particles formed from the leaves and blossoms of the alfalfa, and also particles formed from the alfalfa stems. The portion formed from the leaves of the alfalfa is of proper fineness to serve of itself as a poultry feed, but the portion formed from the stems cannot be used as a poultry feed without further grinding. It has been found that if the material is ground as a whole, in a suitable hammer or attrition mill, the nutritive value of the material, and particularly the vitamine content is impaired. This is due to the fact that in grinding a certain amount of heat is developed. Since such heating is prolonged for a considerable period compared to the period of desiccation, the vitamine content is impaired. The portion of the dried material formed from the leaves and blossoms, of the alfalfa is particularly prone to cause heating when passed thru the hammer or attrition mill, because of its physical form which occasions considerable friction.

In my method, instead of attempting to grind all of the dried material to secure a proper degree of fineness, the material delivered from 28 is screened to remove the coarser fibrous material from the finer material. The coarser material consists principally of the stems and heavier fiber of the alfalfa, while the fine material is formed from the leaves and blossoms of the alfalfa. Any large particles of the leaves and blossoms are readily broken up into particles of relatively small size by the blower 28. This step of separating the dried material into a coarse and fine portion, has been indicated in the drawing at 29, and has been carried out in practice by the use of a 26 mesh screen. The coarser material from step 29 is then subjected to grinding in a suitable hammer or attrition mill, as indicated at 31. This ground material, which contains valuable nutrients, is then remixed with the finer material from 29, to produce the final product.

It should be noted that in my method, not only do I avoid the detrimental effect of heating by the step of grinding after desiccation, but also my method eliminates grinding all of the desiccated material, with resultant saving in equipment.

I claim:

1. In a method of manufacturing stock feed from alfalfa and the like, characterized by the use of a desiccating chamber and a screen or like means for separating coarser from finer material, the steps of chopping the alfalfa while the same contains sufficient moisture so as not to be brittle, to a state of fineness whereby the pieces can be supported by a drying gas, suspending the chopped material in a drying gas within said chamber to effect desiccation of the same, both the chopped material and the drying gas being introduced into the lower part of the chamber, the drying gas within the chamber being caused to flow upwardly with progressively diminishing velocity, pneumatically removing the desiccated material from the upper portion of said chamber and pneumatically delivering the same to said screen, grinding the coarser pieces separated out on the screen apart from the remainder, and then mixing the ground portion together with the material passing through the screen.

2. A method of producing a dried stock feed from alfalfa or the like, characterized by the use of a drying chamber, a pneumatic separator, and a blower for pneumatically handling dried material from the separator; said method comprising chopping alfalfa containing sufficient moisture so as not to be brittle to a state of fineness sufficient to enable support thereof in a current of drying gas, supplying said chopped material to the lower portion of said chamber, causing the material to be supported by a generally concurrent flow of drying gas within said chamber, and carried upwardly therethrough, said drying gas being caused to flow upwardly within said chamber with progressively diminishing velocity, the extent of drying within the chamber being sufficient to render the leaf portion of the material brittle, removing the dried material from the chamber and pneumatically conveying the same together with removed drying gas to the separator, removing drying gas from said separator apart from the dried material, pneumatically removing dried material from said separator and causing the same to pass through said blower, separating out the coarser pieces from the finer remainder of the material, grinding said coarser pieces apart from the remainder, and then mixing the ground portion together with said remainder.

DAVID D. PEEBLES.